US008358269B2

(12) United States Patent
Biswas et al.

(10) Patent No.: US 8,358,269 B2
(45) Date of Patent: Jan. 22, 2013

(54) HUMAN INTERFACE DEVICE (HID)

(75) Inventors: Ashim Biswas, Karnataka (IN);
Bhaktha Keshavachar, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 811 days.

(21) Appl. No.: 12/176,039

(22) Filed: Jul. 18, 2008

(65) Prior Publication Data
US 2010/0013758 A1    Jan. 21, 2010

(51) Int. Cl.
*G06F 3/033* (2006.01)
*G06F 3/00* (2006.01)
*G09G 5/00* (2006.01)

(52) U.S. Cl. ........................... 345/157; 345/158
(58) Field of Classification Search ............ 345/156–170, 345/177, 1.1
See application file for complete search history.

(56) References Cited

U.S. PATENT DOCUMENTS

| | | | | |
|---|---|---|---|---|
| 4,905,001 | A * | 2/1990 | Penner | 341/20 |
| 6,313,825 | B1 * | 11/2001 | Gilbert | 345/156 |
| 6,931,254 | B1 * | 8/2005 | Egner et al. | 455/456.3 |
| 7,020,508 | B2 * | 3/2006 | Stivoric et al. | 600/390 |
| 7,307,620 | B2 * | 12/2007 | Siddeeq | 345/169 |
| 7,321,358 | B2 * | 1/2008 | Faeth | 345/156 |
| 7,810,750 | B2 * | 10/2010 | Abreu | 242/378.1 |
| 7,835,925 | B2 * | 11/2010 | Roe et al. | 705/3 |
| 7,843,425 | B2 * | 11/2010 | Lu et al. | 345/156 |
| 8,022,925 | B2 * | 9/2011 | Lee et al. | 345/156 |
| 2002/0039084 | A1 * | 4/2002 | Yamaguchi | 345/1.1 |
| 2003/0006962 | A1 * | 1/2003 | Bajramovic | 345/158 |
| 2003/0214481 | A1 * | 11/2003 | Xiong | 345/157 |
| 2006/0184993 | A1 * | 8/2006 | Goldthwaite et al. | 725/135 |
| 2006/0248478 | A1 * | 11/2006 | Liau | 715/863 |
| 2008/0149401 | A1 * | 6/2008 | Hagen et al. | 178/18.08 |

* cited by examiner

*Primary Examiner* — Quan-Zhen Wang
*Assistant Examiner* — Michael J Eurice
(74) *Attorney, Agent, or Firm* — Sutherland Asbill & Brennan LLP

(57) ABSTRACT

A user may wear the radio frequency human interface device on a body portion and move the body portion over any even and un-even surface that is not touch sensitive to provide inputs. The radio frequency human interface device may sense, encode, and provide the radio frequency signals to a computing system. The computing system may be provisioned with a radio frequency reader that may receive the radio frequency signal and decode the radio frequency signal before responding to the input. Also, a plurality of users may use radio frequency human interface devices to provide inputs to the computing system concurrently.

20 Claims, 3 Drawing Sheets

HUMAN INTERFACE DEVICE (HID)

BACKGROUND

A user may interact with a computing device using a human interface device (HID) such as the keyboard, mouse, and joy-stick. The underlying technology for the human interface device (HID) has progressed and as a result of the progress in the technology, the mouse has become wireless and keyboards has become optical and wireless. However, the manner in which a user uses the human interface device has not changed much. For example, the manner a user holds the mouse and clicks the mouse and strikes the keyboard has not changed.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes embodiments of a human interface device. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, and digital signals). Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

Figure 1:
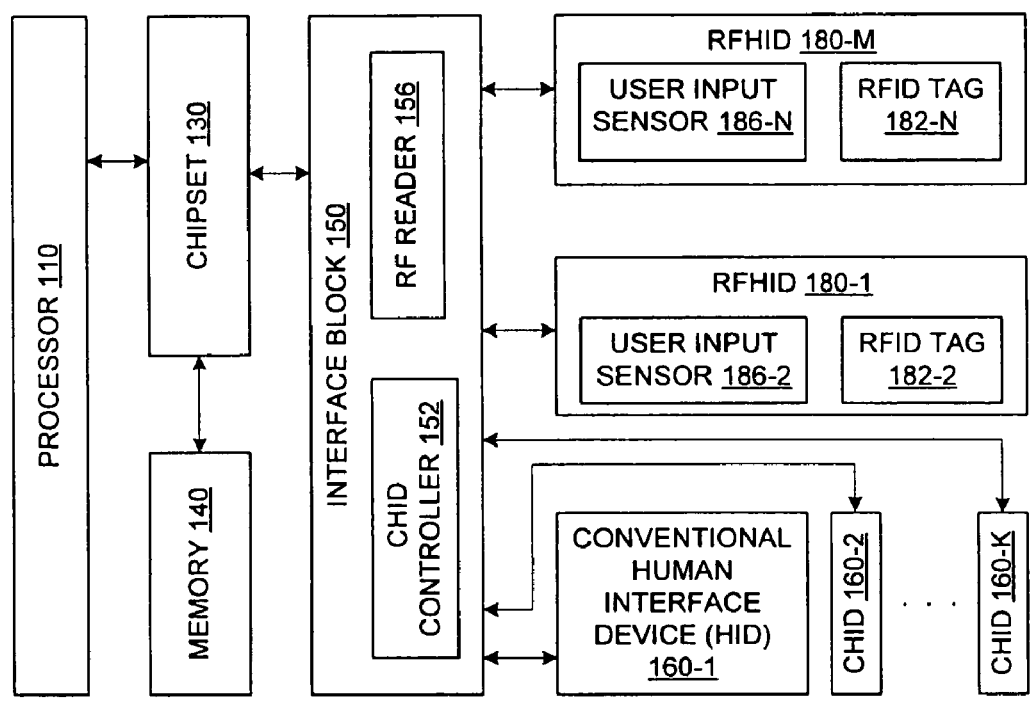
FIG. 1 illustrates a computing system 100, which may support use of radio frequency human interface devices according to one embodiment.

A computing system 100, which may support a human interface device (HID) in accordance with one embodiment, is illustrated in FIG. 1. The computing system 100 may comprise a processor 110, a chipset 130, a memory 140, an interface block 150, conventional human interface devices (CHID) 160-1 to 160-K, and radio-frequency human interface devices (RFHID) 180-1 to 180-M.

The processor 110 may manage various resources and processes within the computing system 100 and may execute software instructions as well. The processor 110 may interface with the chipset 130 to transfer data to the memory 140 and the HIDs 160 and 180. In one embodiment, the processor 110 may receive data units from the chipset 130 and may process the data units before storing the data units in the memory 140 or sending the data units back to the chipset 130 for further processing.

The chipset 130 may comprise one or more integrated circuits or chips that operatively couple the processor 110, the memory 140, the CHIDs 160, and the RFHIDs 180. In one embodiment, the chipset 130 may comprise controller hubs such as a memory controller hub and an I/O controller hub to, respectively, couple with the memory 140 and the HIDs 160 and 180. The chipset 130 may receive inputs generated by the HIDs 160 and 180 on links such as the PCI Express links and may forward the input to the processor 110 for further processing or to the memory 140 for storage purpose.

The memory 140 may store data and/or software instructions and may comprise one or more different types of memory devices such as, for example, DRAM (Dynamic Random Access Memory) devices, SDRAM (Synchronous DRAM) devices, DDR (Double Data Rate) SDRAM devices, or other volatile and/or non-volatile memory devices used in a system such as the computing system 100.

The interface block 150 may provide an interface for the CHIDs 160 and the RFHIDs 180 to communicate with the chipset 130. In one embodiment, the interface block 150 may comprise a CHID controller 152 and a RF reader 156. In one embodiment, the CHID controller 152 may support conventional human interface devices 160-1 to 160-K such as the key-board and the mouse. In one embodiment, the inputs provided by the CHIDs 160 such as the key stroke or movement or click of the mouse may be processed by the CHID controller 152.

In one embodiment, the RF reader 156 may demodulate and decode the signals received from the RFHIDs 180. In one embodiment, the RF reader 156 may emit a low-power radio wave field to energize RFHIDs 180 that exists within the radio wave field. In one embodiment, the RF reader 156 may receive the signals provided by the RFHIDs 180 over a radio frequency link. In one embodiment, the RF reader 156 may comprise RF components to perform transmit and receive functions to process the signals. In one embodiment, the RF reader 156 may comprise a coupling element such as an antenna to transmit and receive signals.

In one embodiment, the RF reader 156 may coordinate transmit and receive operations. In one embodiment, the RF reader 156 may also provide an interface between the host system such as the computing system 100 and the RFHIDs 180. In one embodiment, the interface may perform protocol translations, data conversion, and such other similar operations. In one embodiment, the RF reader 156 may support anti-collision detection algorithms to identify the RFHIDs 180. In one embodiment, the RF reader 156 may also support pairing of RFHIDs 180 to detect movement of a RFHID (e.g., 180-1) relative to one or more other RFHIDs (e.g., 180-2 to 180-N). In one embodiment, the RF reader 156 may support RF protocols such as Bluetooth (BT), radio frequency identification (RFID) protocol, and ultra-wideband (UWB) protocol.

The CHIDs 160 may comprise human interface devices such as the key-board, mouse, or the joy-stick. In one embodiment, the CHIDs 160 may provide signals, which may be processed by the CHID controller 152. In one embodiment, the technology used to design the CHIDs 160 has undergone technological changes and as a result, wireless or optical key-boards are available in the market place. Like-wise, battery-powered mouse or the wireless mouse is available in the market place. The changes in the CHIDs 160 have altered the interface between the human interface device and the computing system 100. However, the technique by which a user provides inputs may not have changed considerably.

The RFHIDs 180 may be designed in shapes and sizes, which may be comfortable for a user to wear it on his/her body. In one embodiment, a user wearing the RFHID 180 may use even or uneven surfaces to provide the inputs. In one embodiment, the user may move his finger fit with the RFHID 180 over his lap or a table, or any other surface to provide inputs. In one embodiment, the surface may be a physical surface over which a finger can be moved. For example, the surface may be a surface of a table, a wall, a fabric, a bed, a floor, and such other similar even or uneven surfaces.

In one embodiment, the RFHIDs 180 may be designed in the shape of a tumbler, which allows the RFHID 180 to be comfortably fit into fingers of the user. In one embodiment, the RFHID 180 may comprise a sensor to sense the movement of the finger and a transmitter to transmit the movement of the finger on which the RFHID 180 is fit into. In one embodiment, the movement of the RFHID 180 may represent desirable movement of the cursor, click of a mouse and such other similar action. In one embodiment, RFHID 180-1 fit on a thumb and RFHID 180-2 fit on an index finger may be paired and the relative movement of the RFHIDs 180-1 and 180-2 may be used, for example, to zoom-in and zoom-out a picture or a document displayed on a screen of the computing system 100.

Figure 2:
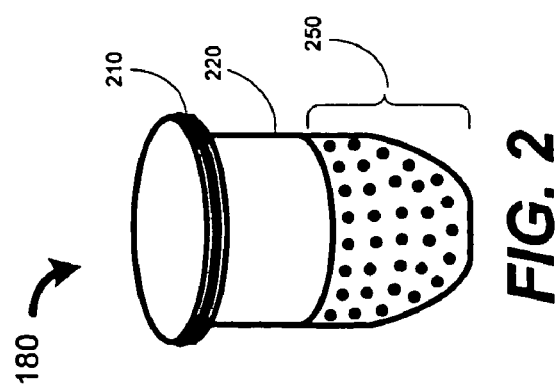
FIG. 2 is a schematic of a radio frequency human interface device, which may allow user to provide inputs in one embodiment.

A radio frequency human interface device (RFHID) 180 in accordance with one embodiment is illustrated in FIG. 2. In one embodiment, the RFHID 180 may comprise a flexible material such as a foldable polythene housing 220, which may be designed in the shape of a tumbler. In one embodiment, the foldable polythene housing portion 220 of the RFHID 180 may comprise sensors to detect the movement of the finger wearing the RFHID 180. In one embodiment, the sensors portion 250 may comprise touch sensitive layer to detect the direction of movement and clicks. In one embodiment, the touch sensitive layer may comprise resistive touch films. In one embodiment, the resistive touch film may lower the cost of the RFHID 180.

In one embodiment, the RFHID 180 may comprise a data encoder, a RFID chip, and an antenna provisioned at the rim 210. In one embodiment, the size of the rim 210 may be designed to accommodate the data encoder, antenna, and the RF chip. In one embodiment, the data encoder and the RFID chip may process the inputs sensed by the sensor portion 250. In one embodiment, the data encoder may capture the inputs detected by the touch sensitive layer and encode the input. In one embodiment, the RFID chip may receive encoded input signal from the data encoder and process it further to perform protocol translations and transfer the signal over the antenna.

In one embodiment, the RF protocols that the RF chip may process may comprise a short-wave radio such as BLUETOOTH, radio frequency identification (RFID) protocol, and ultra-wideband (UWB) protocol. In one embodiment, the RFHID 180 may conveniently fit into the finger while using it and may be folded for easy storage. In one embodiment, a user may use RFHID 180 on more than one finger to provide inputs and the data encoder, RF chip, and the antenna may be provisioned to handle the inputs from more than one RFHIDs 180. In one embodiment, a user such as a gamer may use RFHIDs 180 on more than one finger to enhance the gaming experience by providing inputs by merely moving his fingers.

Figure 3:
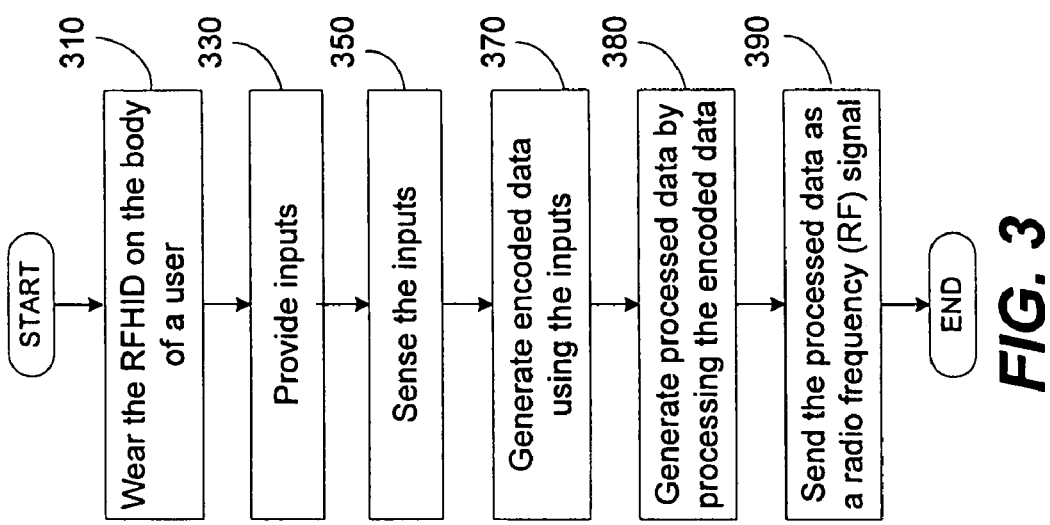
FIG. 3 is a flow-chart illustrating a user providing inputs using RFHIDs according to one embodiment.

An operation of the radio frequency human interface device (RFHID) 180 in accordance with one embodiment is illustrated in FIG. 3. In block 310, the user may wear the RFHID 180 on his/her body portion. In one embodiment, the user may wear the RFHID 180 on the fingers.

In block 330, the user may provide inputs such as movement of the mouse or click of the mouse. In block 350, the sensor portion 250 may sense the inputs provided by the user. In block 370, the data encoder encapsulated in the rim 210 of the RFHID 180 may generate encoded data using the inputs sensed by the sensor portion 250.

In block 380, the RF chip may generate processed data by processing the encoded data. In one embodiment, the RF chip may perform protocol translation and signal format translations to generate a radio frequency (RF) signal. In block 390, the RF chip may send the processed data as a radio frequency (RF) signal.

Figure 4:
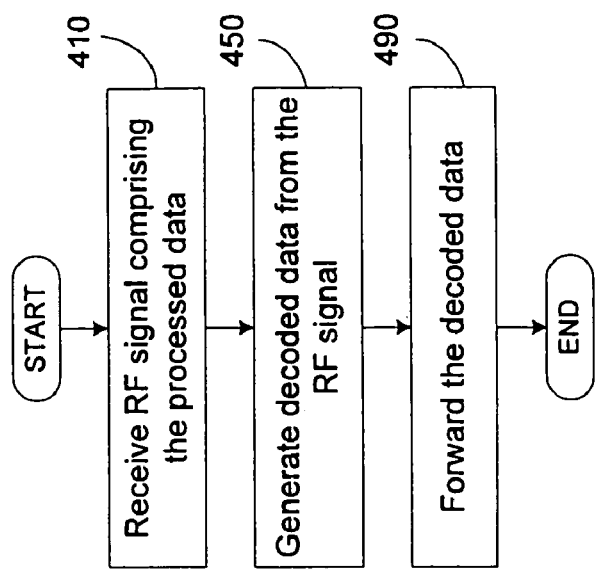
FIG. 4 is a flow-chart illustrating the computing system 100 processing the inputs provided by the RFHIDs according to one embodiment.

An operation of the RF reader 156 in accordance with one embodiment is illustrated in FIG. 4. In block 410, the RF reader 156 may receive the RF signal comprising the processed data. In block 450, the RF reader 156 may generate a decoded signal from the RF signal received over the RF link. In block 490, the RF reader 156 may forward the decoded data. In one embodiment, the RF reader 156 may forward the decoded data to the chipset 130.

Figure 5:
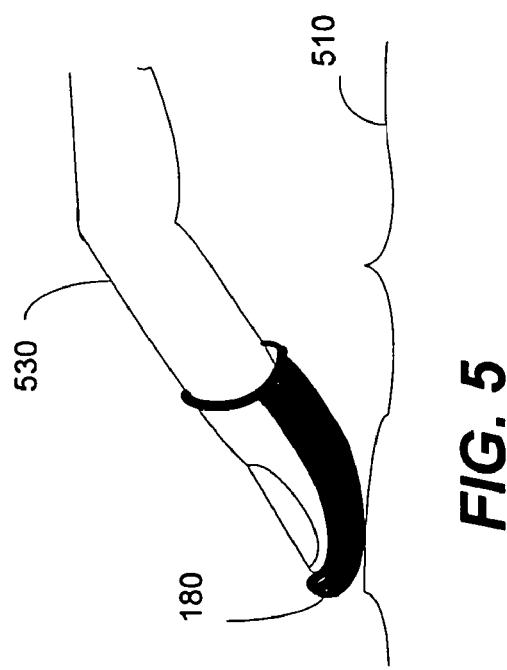
FIG. 5 is a usage model, which illustrates usage of a RFHID over a surface according to one embodiment.

A usage model of using the RFHID 180 in accordance with one embodiment is illustrated in FIG. 5. In one embodiment, a user may wear the RFHID 180 on the finger 530. In one embodiment, the user may move the RFHID 180 over a surface 510. In one embodiment, the surface 510 may be any even or un-even surface. In one embodiment, such an RFHID 180 may allow the user to provide inputs even without having a touch screen. In one embodiment, such an approach would allow user to provide inputs with ease. In one embodiment, the surface 510 may represent the surface of a trouser on the lap portion of the leg of the user. In one embodiment, the user may move his finger over his shirt to provide an input. Such an approach may provide comfort and ease to the user in providing the inputs.

Figure 6:
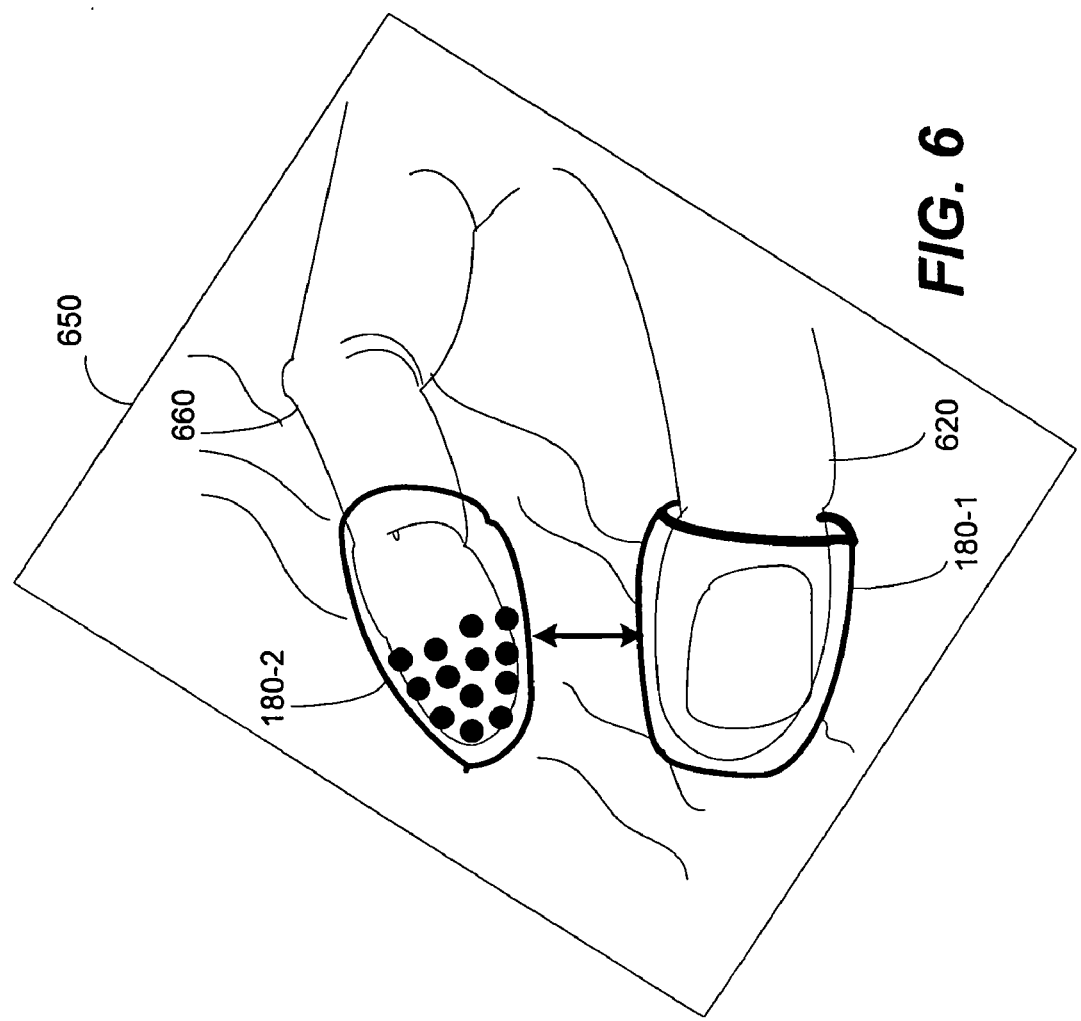
FIG. 6 is a usage model, which illustrates usage of two RFHIDs over a surface according to one embodiment.

Another usage model of using the RFHIDs 180 in accordance with one embodiment is illustrated in FIG. 6. In one embodiment, a user may wear a first RFHID 180-1 and a second RFHID 180-2, respectively, on a thumb 620 and an index finger 660. In one embodiment, the RFHID 180-1 and RFHID 180-2 may, respectively, have a first and a second tag identifier, which may differentiate the RFHID 180-1 and 180-2. In one embodiment, the RFHIDs 180-1 and 180-2 may be paired and the relative movement of RFHIDS 180-1 and 180-2 may be used to, for example, zooming-in or zooming-out pictures on a display device without touching the screen of the display device. In one embodiment, the user may move the thumb 620 and the index finger 660 over any surface including an uneven surface.

In one embodiment, a gamer may wear more than one RFHIDs 180 on different fingers and may provide inputs that may enhance the gaming experience. For example, the gamer may wear more than one RFHID 180 on the fingers to provide multiple inputs.

In one embodiment, a first user may use a first RFHID 180-1 and a second user may use a second RFHID 180-2 to provide inputs to the computing system 100 concurrently. In one embodiment, such an approach may allow two users to use the computing system 100 concurrently. For example, while using a gaming application, two or more users may use a gaming application to play as opponents. In another example, a first group of users and a second group of users may use the same gaming application (e.g., football game) to play a game as opponents. Such an approach may allow multiple users to use the computing system 100.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A system comprising:
   a plurality of radio frequency human interface devices, each comprising:
      having a first end and a second end, the first end being open and the second end being closed;
      the first end having a rim, the rim including a radio frequency chip to provide a radio frequency signal;
      at least a portion of the second end including a tip fitted with one or more sensors that generate input signals; and
   wherein the radio frequency chip is communicatively coupled to and receives the generated input signals from the plurality of radio frequency human interface devices.

2. The system of claim 1, wherein each of the plurality of radio frequency human interface devices further comprises:
   a data encoder located approximate the first end and coupled to the one or more sensors, wherein the data encoder is configured to generate encoded data based at least in part on the generated input signals; and
   wherein the radio frequency chip is communicatively coupled to the data encoder, and is configured to generate the radio frequency signal using the encoded data and transmit the radio frequency signal to a computing system.

3. The system of claim 1, wherein each of the plurality of radio frequency human interface devices comprises a foldable housing.

4. The system of claim 1, wherein at least a portion of the generated input signals further represent a movement of a body portion associated with the plurality of radio frequency human interface devices.

5. The system of claim 1, wherein each of the plurality of radio frequency human interface devices is associated with a tag identifier.

6. The system of claim 1 further comprising a computing system coupled to the plurality of radio frequency human interface devices, wherein the computing system is to receive the radio frequency signal and decode the radio frequency signal and identify a response correlated with the generated input signals.

7. The system of claim 1 wherein each of the plurality of radio frequency human interface devices is tumbler-like in shape.

8. The system of claim 1 wherein the sensors are further configured to generate the input signals when at least a portion of the second end interacts with a non-touch-sensitive surface.

9. The system of claim 1, wherein the plurality of radio frequency human interface devices are used to provide a plurality of inputs, wherein the plurality of inputs define a plurality of actions in a video game.

10. The system of claim 9, further comprising a first group of devices and a second group of devices of the plurality of radio frequency human interface devices, wherein the first group of devices and second group of devices are used by a first group of users and a second group of users to provide the inputs concurrently.

11. A method comprising:
   receiving, from a computing system, an energizing signal to power a plurality of radio frequency human interface devices comprising, each of the plurality of devices comprising a first end and a second end, the first end being open and the second end being closed, wherein the first end comprises a rim that includes a radio frequency chip;
   generating input signals by one or more sensors, wherein the one or more sensors are located on at least a portion of the second end of each of the plurality of radio frequency human interface devices;
   receiving, by the radio frequency chip, the generated input signals from more than one of the plurality of radio frequency human interface devices; and
   transmitting a radio frequency signal from the radio frequency chip, to the computing system.

12. The method of claim 11, wherein each of the plurality of radio frequency human interface devices is foldable for storage.

13. The method of claim 11, further comprising assigning a tag identifier to each of the plurality of radio frequency human interface devices.

14. The method of claim 11, wherein the generated input signals further comprise:
   sensing, by the one or more sensors, one or more inputs from a movement of a body portion of a user associated with at least one of the plurality of radio frequency human interface devices, wherein the user is to wear the plurality of radio frequency human interface devices on a body portion; and
   generating a plurality of signals from the one or more inputs representing the movement of the body portion of the user associated with at least one of the plurality of radio frequency human interface devices.

15. The method of claim 14, wherein the one or more inputs further comprise a movement of the finger.

16. The method of claim 11, further comprising:
   encoding, by a data encoder, the input signals generated by radio frequency human interface device;
   generating the radio frequency signal, wherein the radio frequency signals are based at least in part on the encoding of the generated input signals.

17. The method of claim 16, wherein encoding the generated input signals further comprises converting the generated input signals to define a plurality of actions in a video game.

18. The method of claim 17 wherein receiving by the radio frequency chip the generated input signals from a plurality of radio frequency human interface devices comprises providing a first group of inputs, by a first group of devices of the plurality of radio frequency devices representing usage by a first group of users concurrently with a second group of inputs, by a second group of the plurality of radio frequency human interface devices by a second group of users.

19. A radio frequency human interface apparatus comprising:
   a flexible housing having a first end and a second end, the first end being open and the second end being closed;
   one or more sensors located on at least a portion of the second end, wherein the one or more sensors generate input signals;
   the first end having a rim, the rim defining first open end, and the rim including a radio frequency chip and a data encoder;
   the data encoder coupled to the one or more sensors, wherein the data encoder is to encode data using the generated input signals; and
   wherein the radio frequency chip is coupled to the data encoder and generates a radio frequency signal using the encoded data and transmits the radio frequency signal to a computing system.

20. The apparatus of claim 19, wherein the radio frequency chip is identified by a tag identifier.

* * * * *